US010872027B2

(12) United States Patent
Santos et al.

(10) Patent No.: US 10,872,027 B2
(45) Date of Patent: Dec. 22, 2020

(54) RUN-TIME OR COMPILE-TIME ERROR SOLUTIONS FOR LOCATING MISSING PROGRAM ELEMENTS IN A PROGRAMMING ENVIRONMENT

(71) Applicant: The MathWorks, Inc., Natick, MA (US)

(72) Inventors: Ryan M. Santos, Belmont, MA (US); Jason D. Breslau, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 30 days.

(21) Appl. No.: 15/956,153

(22) Filed: Apr. 18, 2018

(65) Prior Publication Data

US 2019/0324887 A1    Oct. 24, 2019

(51) Int. Cl.
*G06F 11/36* (2006.01)
*G06F 9/38* (2018.01)
*G06F 16/14* (2019.01)

(52) U.S. Cl.
CPC ........ *G06F 11/3612* (2013.01); *G06F 9/3836* (2013.01); *G06F 11/3624* (2013.01); *G06F 16/14* (2019.01)

(58) Field of Classification Search
CPC .. G06F 11/3612; G06F 11/3624; G06F 16/14; G06F 9/3836
USPC .................................................. 717/124–160
See application file for complete search history.

(56) References Cited

U.S. PATENT DOCUMENTS

| | | | | |
|---|---|---|---|---|
| 5,878,262 A * | 3/1999 | Shoumura | ................. | G06F 8/20 717/164 |
| 5,956,513 A * | 9/1999 | McLain, Jr. | .............. | G06F 8/71 717/142 |
| 7,356,679 B1 * | 4/2008 | Le | ....................... | G06F 9/45558 713/1 |
| 7,533,389 B2 * | 5/2009 | Verbeke | ............. | G06F 9/44521 717/166 |
| 8,793,661 B1 * | 7/2014 | Fei | ........................ | G06F 11/362 717/126 |
| 2004/0103406 A1 * | 5/2004 | Patel | ........................ | G06F 8/41 717/140 |
| 2007/0174823 A1 * | 7/2007 | Snover | ................ | G06F 11/3624 717/139 |
| 2008/0141225 A1 * | 6/2008 | Bostick | ................... | G06F 9/445 717/128 |
| 2010/0125837 A1 * | 5/2010 | Lobo | ....................... | G06F 8/443 717/157 |
| 2015/0033202 A1 * | 1/2015 | Wilson | ..................... | G06F 8/43 717/106 |
| 2017/0116109 A1 * | 4/2017 | Perez Acosta | ...... | G06F 11/3664 |
| 2019/0324887 A1 * | 10/2019 | Santos | ................ | G06F 11/3612 |

* cited by examiner

*Primary Examiner* — Marina Lee
(74) *Attorney, Agent, or Firm* — Wolf, Greenfield & Sacks, P.C.

(57) ABSTRACT

Methods and systems associated with a programming environment are described that provide automated or semi-automated recovery during run-time or compile-time operation in response to attempts to access a program element that is not in a working folder or in a folder location for which a path has been specified for accessing the program element.

31 Claims, 6 Drawing Sheets

```xml
<?xml version="1.0" encoding="UTF-8"?>
<settings name="locator" xmlns="urn:math.settings" xsi:schemaLocation="urn:math.settings settings.xsd"
xmlns:xsi="http://www.w3.org/2001/XMLSchema-instance">
  <settings name="desktop">
    <settings name="currentfolder">
      <key name="CurrentFolderSize">
        <int32>
        </int32>
      </key>
      <key name="History">
        <string minArraySize="0" maxArraySize="500">
          <value><![CDATA[C:\Users\jdoe\AppData\Roaming\Archive\R2018a]]></value>
          <value><![CDATA[Z:\35\jdoe.scripts\toolbox\average]]></value>
          <value><![CDATA[Z:\35\jdoe.scripts\toolbox\integrate]]></value>
          <value><![CDATA[Z:\35\jdoe.scripts\toolbox\ode\ode1_solver]]></value>
          <value><![CDATA[Z:\16\jdoe_apps\lang\error_recovery]]></value>
          <value><![CDATA[C:\Users\jdoe\AppData\Local\math_programs\project_M0012]]></value>
          <value><![CDATA[C:\Users\jdoe\AppData\Local\math_programs\project_R0005]]></value>
          ...
        </string>
      </key>
      <key name="HistorySize">
        <int32>
          <value>20</value>
        </int32>
      </key>
    </settings>
  </settings>
</settings>
```

FIG. 3

```
>> load integrate

File "integrate" does not exist in the current folder, but may exist in:
    Z:\35\jdoe.scripts\toolbox\

Change location to the folder or add the folder to the current path.

```
>> load integrate

File "integrate" does not exist in the current folder, but may exist in:
    Z:\35\jdoe.scripts\toolbox\
    C:\jdoe\math_tools\
    C:\jdoe\Temp\

Change location to a folder or add a folder to the current path.

```
>> load integrate

File "integrate" does not exist in the current folder, but may exist in:
    ○ Z:\35\jdoe.scripts\toolbox\
    ○ C:\jdoe\math_tools\
    ● C:\jdoe\Temp\

Change location to the selected folder or add the selected folder to the current path.

RUN-TIME OR COMPILE-TIME ERROR SOLUTIONS FOR LOCATING MISSING PROGRAM ELEMENTS IN A PROGRAMMING ENVIRONMENT

SUMMARY

The described technology relates to automated and semi-automated solutions from run-time or compile-time errors in a programming environment caused by missing program elements. A run-time error or compile-time error can be caused by a request to access a program element (e.g., a file, function, script or other element) that is not in a location specified in the request. For example, a run-time error may be caused by requesting access to a program element that is not in a working folder within the programming environment or in a location specified by a path. A compile-time error may be caused by, for example, an "include" statement within code (e.g., C, C #, or C++ code) or an "import" statement in Python, that requires access to an external program element that is not in a working folder or in a location specified by a path. Instead of terminating execution of the code and/or providing an error message informing the user that the execution cannot be successfully carried out, a computing system can pause execution and use historical folder data to automatically identify one or more possible locations for the missing program element. In embodiments, the computing system can provide solution display information, e.g., data, that can be rendered and used by a user to facilitate locating the missing program element and resuming execution of the code.

Some embodiments relate to a computer-implemented method for recovering, during run-time or compile-time in a programming environment, from an execution or compiling error caused by a request for a program element that is not in a working folder or a location specified by a path. A method of locating a missing program element can comprise acts of receiving, by a computing system, a run-time or compile-time instruction that requires accessing a program element in a working folder or in a folder specified by a path, wherein the program element is identified by an identifier; detecting that the program element is not present in the working folder or the folder specified by the path and that the instruction cannot be performed; in response to detecting that the program element is not present in the working folder or the folder specified by the path, reviewing folder-history data that records folders previously accessed by the user; searching one or more folders identified from the folder-history data to locate a program element having the identifier; or searching one or more related folders to locate the program element, wherein the one or more related folders comprise any combination of super-folders, sibling folders, and sub-folders; and providing location display data containing information that indicates to the user one or more folders in which a program element having the identifier is located.

Some embodiments relate to a data-processing system, comprising at least one processor, that is adapted with computer program instructions to execute one or more methods related to recovering, during run-time or compile-time in a programming environment, from an execution error caused by a request for a program element that is not in a working folder or in a location specified by a path as described above and in further detail below.

Some embodiments relate to computer-readable medium encoding computer program instructions that, when executed by at least one processor, perform one or more methods related to recovering, during run-time or compile-time in a programming environment, from an execution error caused by a request for a program element that is not in a working folder as described above and in further detail below.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the present invention will become more apparent from the detailed description set forth below when taken in conjunction with the drawings.

DETAILED DESCRIPTION

Methods and aspects of locating missing program elements and resuming operation in response to run-time or compile-time errors described herein can be implemented in various programming environments. For purposes of discussion below, technical computing environments (TCEs) are used as examples of a programming environment, but the invention is not limited to TCEs. Examples of TCEs include, but are not limited to, MATLAB® available from The MathWorks, Inc. of Natick, Mass. and Mathematica® available from Wolfram Research, Inc. of Champaign, Ill. Additional examples of TCEs to which the present embodiments can be applied are provided below. Programming environments can be any computing environment in which code is written using a computing language, compiled, and executed. Example computing languages that can be used in a programming environment include, but are not limited to, C, C++, FORTRAN, and Java. Additional examples of computing languages used in programming environments to which the present embodiments can be applied are provided below.

Figure 1:
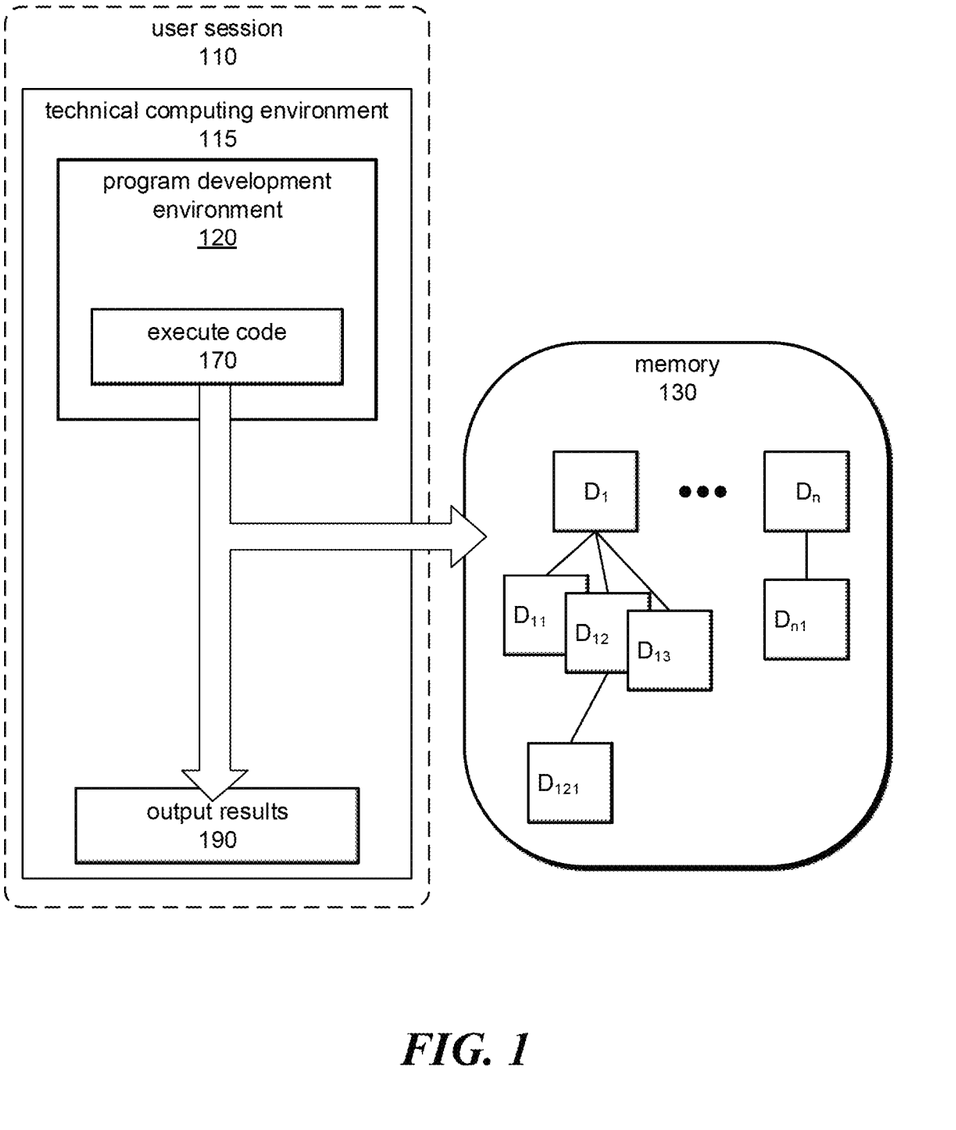
FIG. 1 depicts, in overview, an example of system supporting a technical computing environment in which the present embodiments can be implemented.

Referring to FIG. 1, a user can work in a technical computing environment (TCE) 115 during a user session 110. The TCE can comprise a technical computing program for text-based or graphical modeling that executes on one or more computing systems, an example of which is described in further detail below in connection with FIG. 8. A TCE can include hardware or a combination of hardware and software that provides a computing environment in which a high-level computing language (e.g., MATLAB language) can be used to perform computations or construct models related to disciplines, such as, but not limited to, mathematics, science, engineering, medicine, business, etc., more efficiently than if the tasks were performed in a conventional computing environment, such as an environment that requires the user to develop code in a conventional programming language, such as C++, C, Fortran, Pascal, etc. A high-level language can be an interpretive language or a graphical programming language. During work in the TCE 115, the user can develop code for desired computations and functionalities within a program development environment 120. As an example, the user might develop code using a high-level language or graphical symbols that predicts responses of an electronic circuit to different input signals or variations in responses of a circuit due to changes in parameters of one or more circuit components within the electronic circuit. As will be appreciated, a TCE 115 can be used for a wide variety of technical computations and is not limited to only electrical engineering computations.

In the process of developing code, a user can produce multiple program elements that are used when performing computations. The types of program elements produced can include code files, data files, scripts, functions, header files, libraries, toolboxes, add-ons, and any other data structures that may be used by the code that is being developed. For example, data files may be read when executing the code during a computation. In some embodiments, the program elements are executables, e.g., executable code compiled from source code. Executable program elements can also include embedded applications. An embedded application can comprise code that is intended to be deployed on a computing system or device to provide functionality and/or user interface attributes defined in the embedded application for controlling the system or device. During development of an embedded application in a programming environment (e.g., a textual programming environment such as MATLAB®, Julia, Python, or a graphical programming environment such as Simulink® (available from The MathWorks, Inc. of Natick, Mass.), LabVIEW (available from National Instruments Corporation of Austin, Tex.), and VisSim (available from Visual Solutions of Westford, Mass.)), at least a portion of the embedded application may be stored within a working folder or in a location identified by a specified path that provides access to the embedded application from the working folder.

In some cases, embedded applications can be used in interactive programming environments such as MATLAB® Live Editor, which is available from The MathWorks, Inc. of Natick, Mass., or Shiny (available from RStudio Inc. of Boston, Mass.), and Jupyter (available as open-source software). In such environments, code can be written, tested, annotated with text and images, and results plotted all within a single displayed user interface. For example, context switching between multiple user interfaces for code writing, code execution, and plotting of results is not needed since these different aspects of code development appear together on a same display screen. Scripts may be used to provide different display functionalities in such interactive programming environments. In some embodiments, embedded applications can be used to enhance or add visualizations or other attributes to the interactive programming environment. Embedded applications can be added to or inserted into scripts that are used to execute functionalities in such interactive programming environments. Alternatively, embedded applications may be referenced and launched from a location using a specified path.

The produced program elements can be stored in memory 130 on the computing system. For complex projects and complex codes, program elements that may be used during a computation may have been stored at different locations in memory 130, e.g., in different super-folders $D_i$, different folders $D_{ij}$, and/or different sub-folders $D_{ijk}$. For example, a majority of program elements needed for a computation may reside in a first folder $D_{12}$, and one or more additional program elements needed for the computation may reside in a sibling folder $D_{13}$. It will be appreciated that there can be fewer or more folders than those shown in FIG. 1 and the program elements can be distributed among more than two folders and/or among more than one memory device or types of memory devices in system memory 130.

When a user takes an action to execute 170 code, the computing system can attempt to access, during run-time, all program elements needed for the computation. In embodiments, a user in a TCE executes 170 code from within a "working folder." A working folder (e.g., folder $D_{12}$) is a folder on a computing system representative of the user's working "location" within the system's folder structure and from which the user can issue commands and receive information to operate the system. When executing code in a TCE, the working folder should include the code file for the code to be executed. Provided the code file and any other program elements needed for code's execution are present in the working folder, the code will execute 170 and output 190 results that may be rendered on a user interface and/or stored in one or more data files, for example.

In embodiments, a request to execute or compile code can call upon code or other program elements needed by the code using one or more specified paths. A specified path can identify a location of a program element that is not in the working folder and ostensibly resides in another folder or file identified in the path. In some cases, the path can identify other sources for a program element within a virtual files system. For example, a source for a program element within a virtual files system can include a folder or directory at a remote address (e.g., identified using a reference comprising a uniform resource locater or machine address on a local network) that is accessed over a network. Provided the code file and any other program elements needed for code's execution are present in the specified path(s), the code will execute 170 and output 190 results.

There can occur instances in a TCE when code execution is invoked and at least one program element necessary for execution of the code is not present in the working folder and/or is not present in a folder path specified for the code and/or one or more program elements. For example, a user may change their working folder, or working directory in some systems, (e.g., by executing a "cd" or "chdir" command, clicking on and opening a different folder, or otherwise selecting a folder) while working in a TCE and then attempt to run code that was stored in a previous, different folder. In some cases, the user may change from a current working folder to any location within a virtual file system. As another example, a user may move a data file from a first folder to a different folder for use by a second executable code. The first folder may include a first executable code which requires access to the data file. As another example, a program element may have been moved from a location in a specified path. In either case, when execution of code in a TCE attempts to access a program element that is not present in the working folder from which the execution commenced, or is not in a specified path, then the execution can terminate abruptly and the computing system can output an error message stating that a program element does not exist or could not be found. It is then up to the user to manually figure out what caused termination of the executing code, locate any missing program elements, and either manually move the user's current location to a folder containing the missing program elements, manually move any missing program elements to the working folder, and/or manually define a folder path to allow the TCE to access the missing program elements from the working folder. Once program-element locating measures are taken, the user can try again to execute the code. As may be appreciated, such manual accounting for and reorganizing program elements consumes time, can be tedious, and impedes development of technical computing codes.

Figure 2:
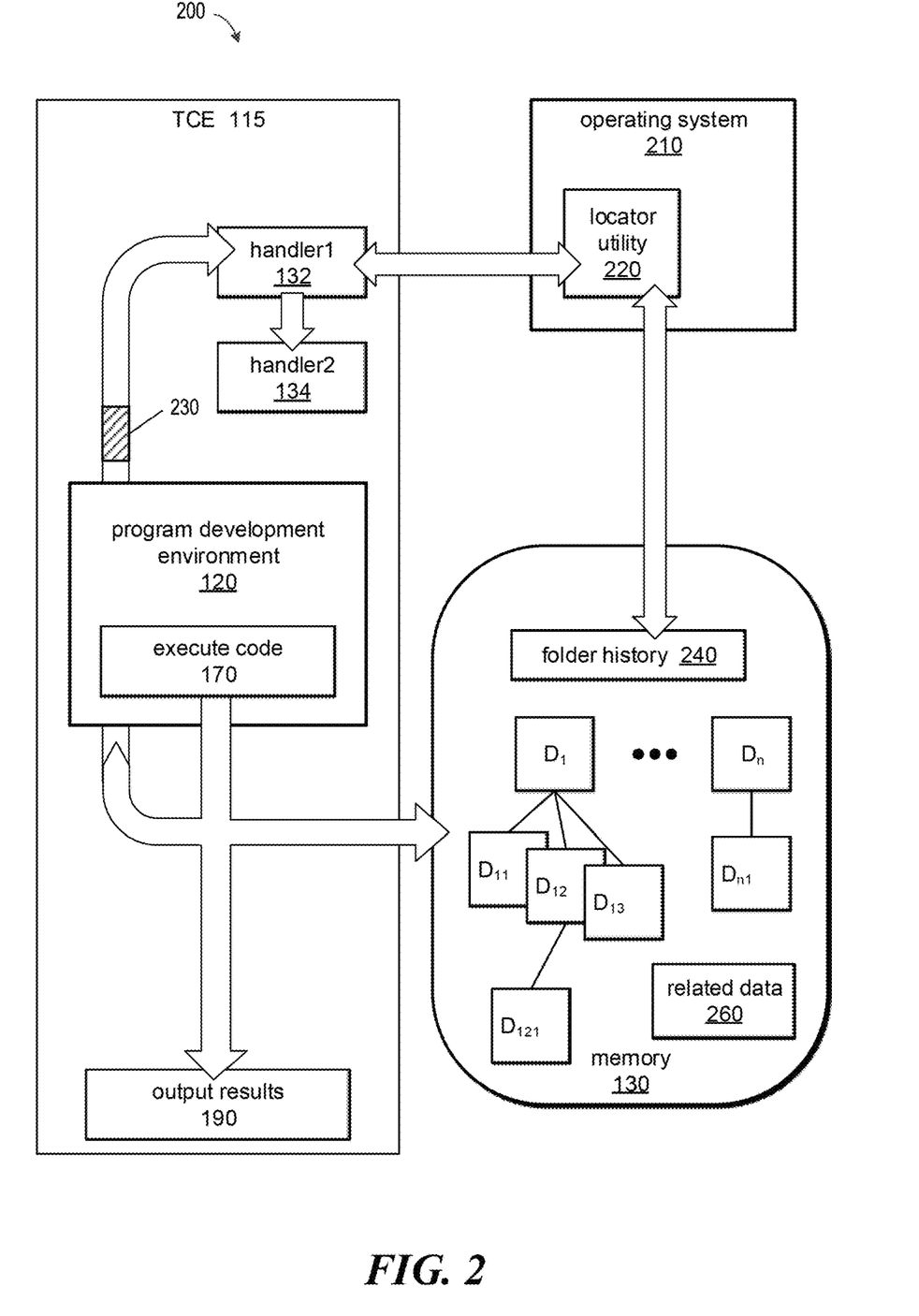
FIG. 2 depicts example system aspects relating to locating missing program elements in response to an execution or compiling error caused by a request for a program element that is not in a working folder or in a location specified by a path.
Figure 3:
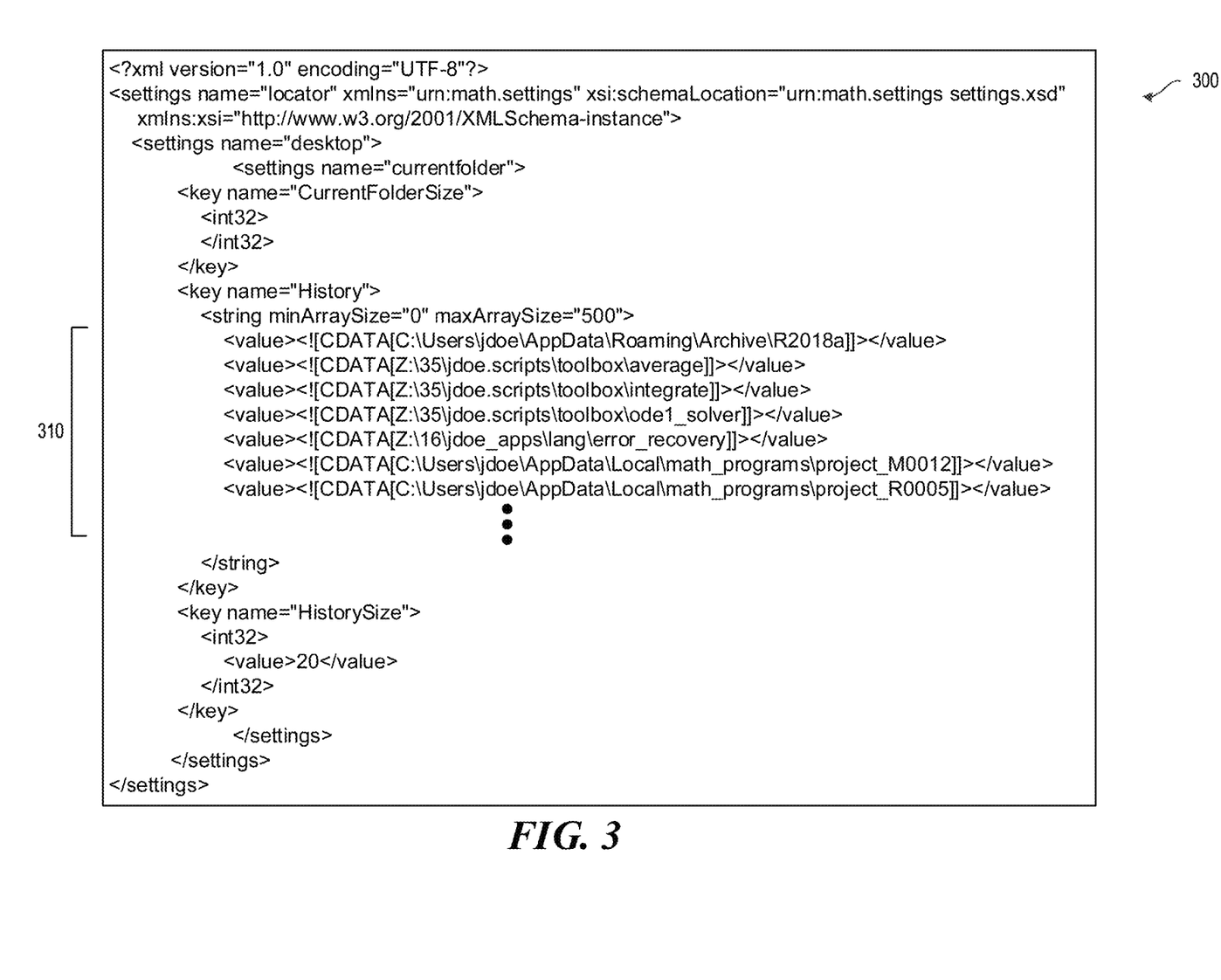
FIG. 3 illustrates an example of historical folder data.

In embodiments, a computing system 200 can be adapted to perform automated and/or semi-automated locate-and-resume operation when attempting to access missing program elements during run-time in a TCE, as depicted in FIG. 2. In various implementations, a folder history 240 can be maintained in memory 130 that is accessible to the computing system 200. The folder history 240 can comprise, for each user of the system, a data record of the most recent N folders that the user has accessed within the system, including folders within a virtual file system. The value N can be an integer between 5 and 500. In some cases, the value N can be significantly larger, e.g., any value up to 1 million or even greater. In some cases, the computing system 200 can be configured so that a user can set the value of N according to the user's preference. Folder-history data in the folder history can be maintained in any suitable form (e.g., a file or a data log stored in memory 130, a series of entries stored in cache memory). An example of a folder history is shown in FIG. 3 and described further below.

The computing system 200 can be modified to further include an interrupt or exception handler 132 and a locator utility 220. The handler 132 can comprise code that executes within the TCE 115. The locator utility 220 can comprise code that executes as part of the operating system in response to a call by the handler 132. A conventional handler 134 can also be present that provides a conventional error message in response to a missing program element (e.g., a "file does not exist or cannot be found" message), and to abruptly terminate execution of the code which led to the error message.

In embodiments, during execution 170 of code, the TCE 115 may throw an exception 230 in response to being unable to access a program element that is required for execution of the code. The missing program element can have a name, pointer, or other identifier that is used to identify the program element. In some cases, handler 132 can intercept or receive the exception 230 that otherwise would have been received by a conventional handler 134. Execution of the code can be paused by the TCE 115. In some cases, the handler 132 itself can execute locating actions or call upon a locator utility 220 to execute locating actions in an effort to locate the missing program element. The locator utility can comprise code that executes to carry out searching procedures as described in further detail below.

In some cases, locating actions can comprise accessing the folder history 240 for the user who is executing 170 the code. The folder history 240 can be analyzed to identify one or more folders recently accessed by the user. "Access" to a folder can comprise executing "cd" or "chdir" commands, clicking on and opening one or more folders, or otherwise selecting a folder icon, symbol, or text that allows a user to access program elements from or save program elements to the desired folder (or to a desired directory on some systems). Locating actions can further comprise searching one or more folders identified in the folder history 240 for one or more program elements having an identifier that matches the missing program element's identifier.

According to some implementations, a search of the folders identified in the folder history 240 may be prioritized to expedite locating the missing program element. For example, folders may be searched in an order from most recently accessed to oldest dates of access. In some cases, folders may be searched in an order from most often accessed to least often accessed. In such embodiments, the folder-history data can include records of access dates and times for each folder.

Alternatively or additionally, a locator utility 220 can identify the current folder from which a user executes 170 code and search super-folders, sibling folders, and/or sub-folders before or after accessing folder history 240. For example, if a user executes 170 code from a folder $D_{12}$ and an exception 230 is thrown due to a missing program element, then locator utility 220 may search sibling folders $D_{11}$, $D_{13}$ (which are folders that stem from a same parent folder as the working folder), super-folder $D_1$, and sub-folder $D_{121}$ prior to or after searching folders identified in the folder history 240. According to some embodiments, the order in which folders are searched can be set by a user or system administrator. In embodiments, there can be more than one super-folder and more than one sub-folder.

As a result of searching folders in which the missing program element may be located, locator utility 220 can provide information back to TCE 115 relevant to the missing program element. In some cases, where an identifier for the program element is not located in any of the searched folders, locator utility 220 can provide information to the handler 132 in TCE 115 indicating that the program element could not be found. The handler 132 can then pass control to a conventional handler 134 that provides conventional error display data that, when rendered, indicates to a user that a program element cannot be found.

In cases where a program element having the identifier associated with the missing program element is found in a folder, resuming operation may proceed in one of several ways. A first, fully-automated process can occur in a first case in which only one program element bearing the identifier for the missing program element is found in only one folder as a result of the search. In this case, handler 132 can execute code, or cause execution of code, to either (1) automatically change the user's working folder to the one folder containing the identifier for the missing program element or (2) automatically define a folder path to the TCE 115 so that the TCE 115 can access the missing program element from the user's working folder. This second step is sometimes referred to as adding a path to the working folder.

In a semi-automated process, the handler 132 can execute code, or cause execution of code, to provide location display data that, when rendered, provides options to a user to either change the user's working folder to the one folder containing the identifier for the missing program element or define a folder path to the one folder containing the program element with the identifier matching the missing program element, so that the TCE 115 can access the missing program element from the user's working folder. A rendering for a semi-automated process is depicted in the example of FIG. 4 and described further below.

Figure 5:
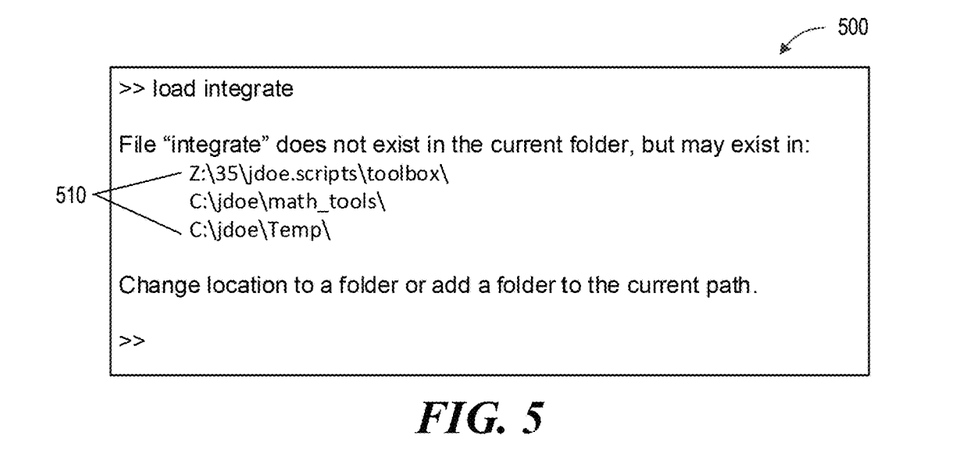
FIG. 5 illustrates an example of rendered location display information.
Figure 6:
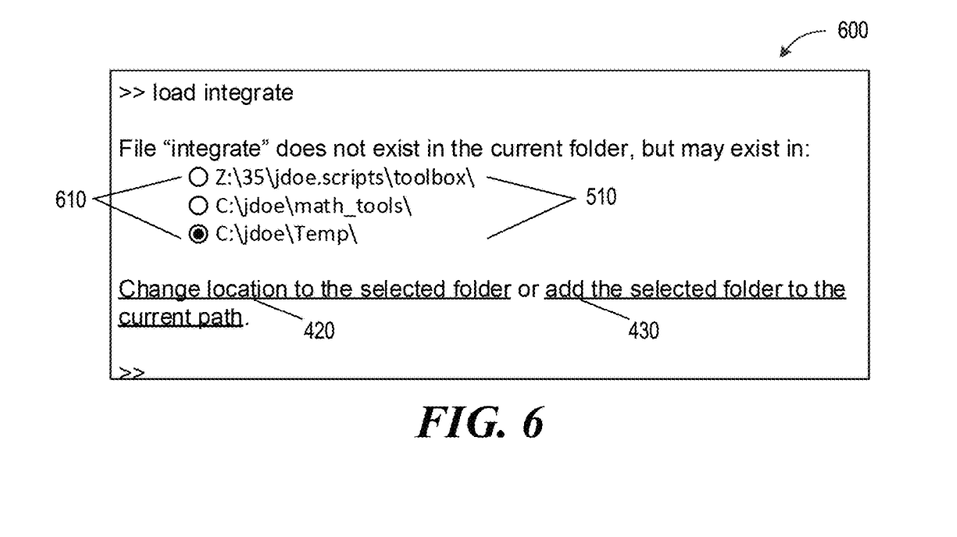
FIG. 6 illustrates an example of rendered location display information.

In another semi-automated process, the handler 132 may receive information identifying multiple folders in which more than one program element bearing the identifier of the missing program element has been located by the locator utility 220. In such cases, the handler 132 can execute code, or cause execution of code, to provide location display data that, when rendered, provides a listing of folders in which the missing program element may be located, as depicted in the examples of FIG. 5 and FIG. 6 and described further below. In embodiments, a user can readily use and/or interact with the displayed information about the missing program element to expeditiously change folder or add a path to a folder containing the missing program element so that the TCE 115 can resume execution of the code.

FIG. 3 depicts one example of how folder history 240 may be maintained by a TCE 115. In this example, folder history is maintained as a log 310 of string values corresponding to folders accessed by a user over one or more user sessions. The log 310 can be maintained as XML entries of string values indicating the paths and folder to which a user navigated, for example. In some cases, the log 310 may be kept in cache memory. It will be appreciated that a folder history 240 can be stored in a data structure of any suitable form.

Figure 4:
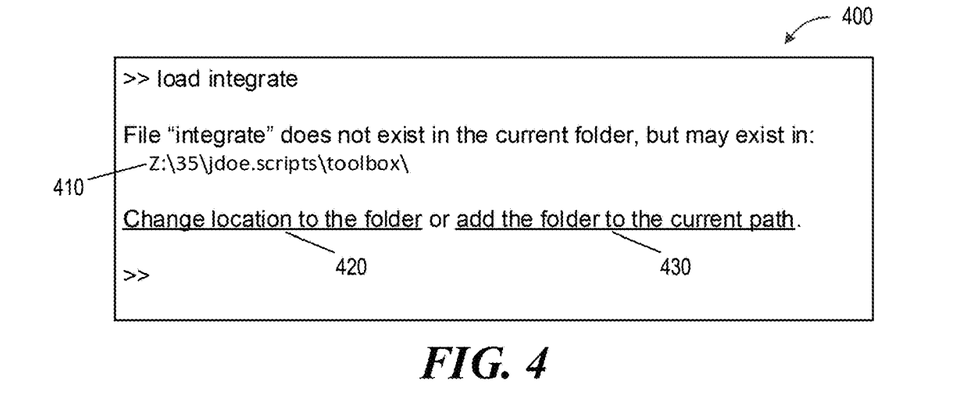
FIG. 4 illustrates an example of rendered location display information.

FIG. 4 depicts one example of a rendering 400 of location display data that can be reviewed and used by a user to identify a location of a missing program element and to allow code to resume execution in a TCE 115. In embodiments, text can be displayed that informs the user of a missing program element (a file comprising a name "integrate" in this example). A file extension may or may not be displayed. If the missing program element is located in only one folder as a result of an automated search for the missing program element, then a folder path 410 can be displayed showing a possible location of the missing program element. A rendering 400 like that illustrated in FIG. 4 can also be used to provide the user with one or more locate-and-resume selections 420, 430 that will allow the program element to be accessed for resumed execution of the code in the TCE 115. A first locate-and-resume selection 420 can comprise active text or an icon that, when selected, automatically changes the user's working location to the folder containing the missing program element. A second locate-and-resume selection 430 can comprise active text or an icon that, when selected, automatically defines a folder path for the TCE 115 so that the missing program element can be accessed from the user's working folder. In some embodiments, a rendering 400 may not include active text or icons and only provide information that can be used by the user to manually change the working folder or define a folder path that allows access to the missing program element from the working folder.

In some cases, a user may define, e.g., as a default setting, a preferred locate-and-resume process. For example, a user may select as a default setting locate-and-resume selection 430 that automatically defines a folder path for the TCE 115 so that the missing program element can be accessed from the user's working folder. When selected as a default setting, the locate-and-resume process can be automatically executed whenever a missing program element is located in only one folder without further user review and interaction with a user interface, such as that shown in FIG. 4. In such a fully-automated locate-and-resume process, there may be no rendered display of location display data according to some implementations. In other cases, location display data may be rendered to provide the user with information showing what actions were taken (e.g., a missing program element having a displayed identifier was located and a folder path, which may be displayed, to the missing program element was defined to allow access to the missing program element).

If two or more program elements having identifiers that match the missing program element identifier are found in two or more folders, then two or more folder paths 510 can be listed on a rendering 500, as depicted in FIG. 5. For the example shown in the figure, none of the text may be active. In such an embodiment, a user can review the information and manually change the working folder or define a folder path to the TCE that allows access to the missing program element from the working folder. Even though the user may manually configure the TCE to access the missing program element, the user can do so without having to search for the missing program element.

FIG. 6 depicts another example of a rendering 600 of location display data that can be used when two or more program elements having identifiers that match the missing program element identifier are found in two or more folders. In embodiments, radio buttons or selectable icons 610 can be displayed adjacent to each listed folder path 510 that allows a user to select one or more of the folder paths. A user can then select one of the locate-and-resume selections 420, 430 that will allow the program element to be accessed by either changing the working folder or defining a folder path for accessing the program element. With as few as two selections by the user, execution of code can be resumed by the TCE 115.

In some cases, an identifier matching the identifier for the missing program element may not be found. For example, the program element may have been deleted or renamed during editing of the program element. In some embodiments, a locator utility 220 (referring to FIG. 2 again) can be configured to additionally search a trash or recycle bin folder on a computing system where deleted program elements may be placed prior to being permanently deleted from the computing system. If located in a trash or recycle bin, the system can include the program element's location information in a missing program element rendering 400, 500, or 600.

In some implementations, a computing system can be configured to store information relevant to a program element in a related data store 260. For example, TCE 115 may store identifiers for related data structures in a look-up table that is indexed by program element identifiers. Related data structures can comprise other files (e.g., code or data files), functions, routines, libraries, etc. that are used in conjunction with code for the program element that is executed in the TCE and potentially results in a missing program element error or exception. If the locator utility 220 is unable to locate a missing program element using the program element's identifier and searching the folder history 240, the locator utility 220 can search the related data store 260 using the missing program element identifier as an index to identify one or more identifiers for other data structures that were previously used in conjunction with the missing program element. The locator utility 220 can then search folders identified in the folder history 240 again to locate one or more identifiers for related data structures. If one or more identifiers for related data structures are found in one or more folders, information about the folder or folders can be included in location display data for rendering as described in connection with FIG. 4-FIG. 6.

Figure 7:
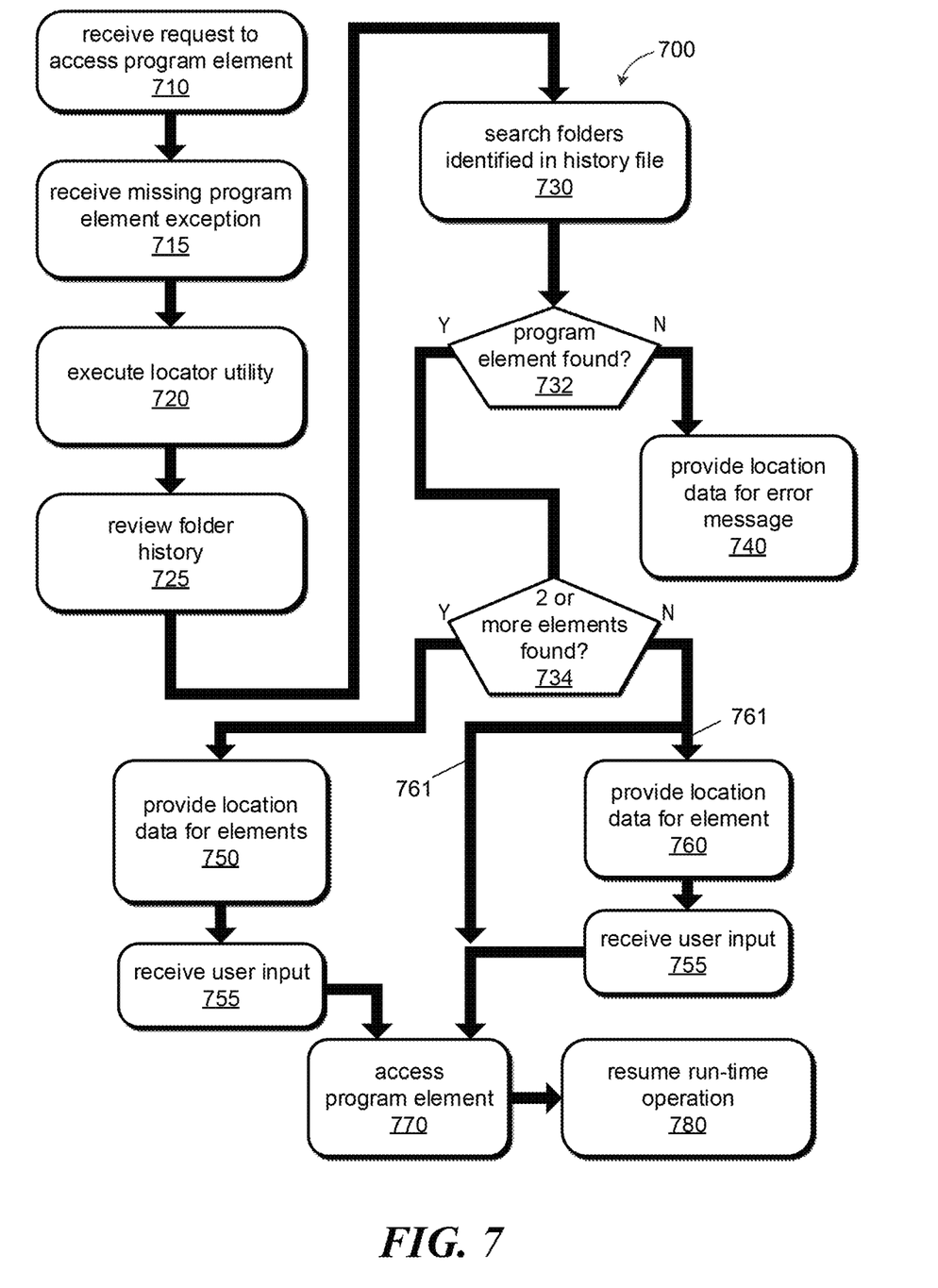
FIG. 7 illustrates an example method diagram relating to locating missing program elements in response to an execution or compiling error caused by a request for a program element that is not in a working folder or in a location specified by a path.

An example method for locating and resuming operation during run-time or compile-time in a programming environment in response to an execution or compile-time error caused by a request for a program element that is not in a working folder or in a location specified by a path is illustrated in FIG. 7. The request for the program element can be caused by a user instructing the computing system to execute runnable code in a programming environment, for example. In embodiments, a computing system can, during run-time operation, receive (act 710) a request to access a program element that is required for execution of code. In some cases, the request can comprise a run-time instruction such as an include statement or a function call executed within code. If the requested program element is not present in a target location (e.g., a working folder), then the computing system can throw an exception 230 or otherwise indicate an error condition. A handler 132 can receive (act 715) a missing program element exception or other error indicator and cause execution (act 720) of a locator utility 220.

In embodiments, a locator utility 220 can read (act 725) a folder history 240 that is maintained by the computing system. The folder history can comprise a record of a number of folders accessed by a user during recent user sessions. Based on the review of the folder history, the locator utility 220 can search (act 730) one or more folders identified in the folder history 240. If the missing program element is not found as a result of searching by the locator utility 220, then the computing system can provide (act 740) conventional missing program element information, e.g., data, for rendering on a display.

If at least one program element having an identifier that matches an identifier for the missing program element is located in a searched folder, the computing system can determine (act 734) whether two or more matching program element identifiers have been located in the searched folders. If two of more matching program element identifiers have been found, then location display data can be provided (act 750) for rendering on a display location data (e.g., folder paths) for the program elements having identifiers that match the identifier for the missing program element. The computing system can then receive (act 755) user input that allows the TCE 115 to access (act 770) the missing program element and resume (act 780) run-time operation of executable code.

If searching (act 730) by a locator utility 220 returns only one program element having an identifier that matches an identifier for the missing program element, then program flow can proceed along one of two alternate paths. In a first path 761, the computing system can be configured for fully-automated locating and resuming operation from a missing program element exception, for example. In such a case, the computing system can automatically change location from a current folder to the folder containing the missing program element, or define a folder path that will allow the TCE to access the missing program element from the working folder. After automated corrective acts, the computing system can access (act 770) the missing program element and resume (act 780) run-time operation of executable code.

In a second flow path 762, the computing system can provide (act 760) location display data that, when rendered, indicates location data for the missing program element. The computing system can then receive (act 755) user input that allows the TCE 115 to access (act 770) the missing program element and resume (act 780) run-time operation of executable code. Execution of the first path 761 or second path 762 can be determined by user settings of the computing system.

In some implementations, the missing program element is a function defined in a toolbox or add-on, and the program element may be missing because the toolbox or add-on has been disabled. In some implementations, disabling a toolbox or add-on comprises moving the toolbox or add-on to a location other than the working folder (e.g., to a disabled program element folder) or removing a link (e.g., a specified path) that identifies the location of the add-on or toolbox. In either case, the system can maintain a record of disabled add-ons and/or toolbox functions. In embodiments, an attempt to call a disabled add-on or function can result in an "undefined function" message or other error message. Such a message can be detected according to the present embodiments, and cause the locator utility 220 to search (act 730), additionally or alternatively, the record of disabled add-ons and toolbox functions. If found, the system can display a prompt to the user that would allow the user to re-enable the add-on or function.

Additional examples of TCEs to which the present embodiments can be applied include Octave; Python; Julia; Comsol Script; MATRIXx from National Instruments; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; and aspects of a Unified Modeling Language (UML) or SysML environment; etc.). In some cases, the present embodiments of locating missing program elements and resuming operation can be applied to a hybrid environment that includes one or more of the above-referenced text-based environments and one or more of the above-referenced graphically-based environments.

When used in programming environments where compilation of code is required for testing the code, the present embodiments of locating missing program elements and resuming operation can provide significant time savings in developing and testing code. For example, the programming environment can operate from a working folder or working directory where it will place compiled code corresponding to one or more portions of code under development. The compiled code can be a portion of a larger code base that is being developed, tested, or used. If the compiled code portions are needed, the programming environment will use the compiled code in the working directory. If the required compiled code is moved out of the directory, or if the user changes location to another directory, then the programming environment may recompile the code from source code (for which the location may need to be identified by the user).

For sizable projects, the recompilation can take as much as 30 minutes or more. By applying the present embodiments, the programming environment can be directed (automatically or semi-automatically as described above) to the compiled code and eliminate the need for time intensive recompilation of code.

The present embodiments are also applicable to other aspects of programming environments. For example, a user may organize code development into a "project" that comprises a main working folder. In some cases, one or more libraries at other locations can be added to the project by specifying a reference (e.g., directory path) to a location containing each added library. If the library moves, the programming environment, when attempting to execute code in the project, can exhibit an error state. The present embodiments of locating missing program elements and resuming operation can be used to avoid the error state and automatically or semi-automatically continue operation and execute the code.

As another example, a portion of a project can comprise a model that is represented by one or more blocks in a graphical programming environment. A block can comprise code and have predefined or user-defined functionality. The one or more blocks may be stored in a working directory or at a location that is identified by a specified path and associated with the model. If a block is moved, the programming environment can exhibit an error state at compile time because a connection or referencing between the block and the model is no longer valid. The present embodiments of locating missing program elements and resuming operation can be used with blocks and/or models in such programming environments to avoid the error state and automatically or semi-automatically continue operation and execute the code.

In some programming environments, connections between two blocks or models may be referred to as a "signal." A signal can be represented by any one of various data types that can be specified by a programmer. For example, if the signal data type is specified as a structure or some complex data type, it may be defined in an associated file (e.g., a ".m" or ".c" file for MATLAB®) that is stored in the working directory or at a location identified by a specified path. If the file containing the data type definition is moved or the user changes to a different location from the current working folder, then the data type can become indeterminate causing failure of compilation of the code containing the data type. In embodiments, an undefined data type error occurring during an attempted compilation can be detected according to the present embodiments, and cause the system to search for the file containing the definition. The file may be identifiable from an "include" statement, for example. Once found and identified automatically or semi-automatically, compilation of the code can proceed.

Examples of programming languages used in programming environments to which the present embodiments can be applied include, but are not limited to, Ada, Basic, C, C++, C #, MATLAB, FORTRAN, Pascal, assembly code, and Hardware Description Language (HDL) code, such as VHDL, Verilog, SystemC, Java, JavaScript, Python, Julia, R, R++, Octave, Ruby, and iOS/Swift. Some of these programming languages may be referred to as textual programming languages. Graphical programming can also be employed in a programming environment. Simulink® and LabVIEW® are two example programming environments that support graphical programming. Code can be textual code or graphical code within any of the textual or graphical programming environments.

Although the above methods and computing system are described mainly in connection with recovering from a run-time error in a technical computing environment for which a requested program element is not present in a working folder or in a location specified by a path, the above methods can be extended to various types of missing program elements such as, but not limited to, missing functions, missing library functions, missing scripts, missing data files, etc. that are required for completion of an executable command. In some cases, executable commands can be issued in non-technical computing environments, such as a basic system command of opening, closing, running, or deleting a file. Additionally, although the descriptions above are expressed in terms of folders, the embodiments also apply to computing systems in which files are organized into directories. In some systems for which the embodiments apply, the terms "folders" and "directories" may be used interchangeably.

Figure 8:
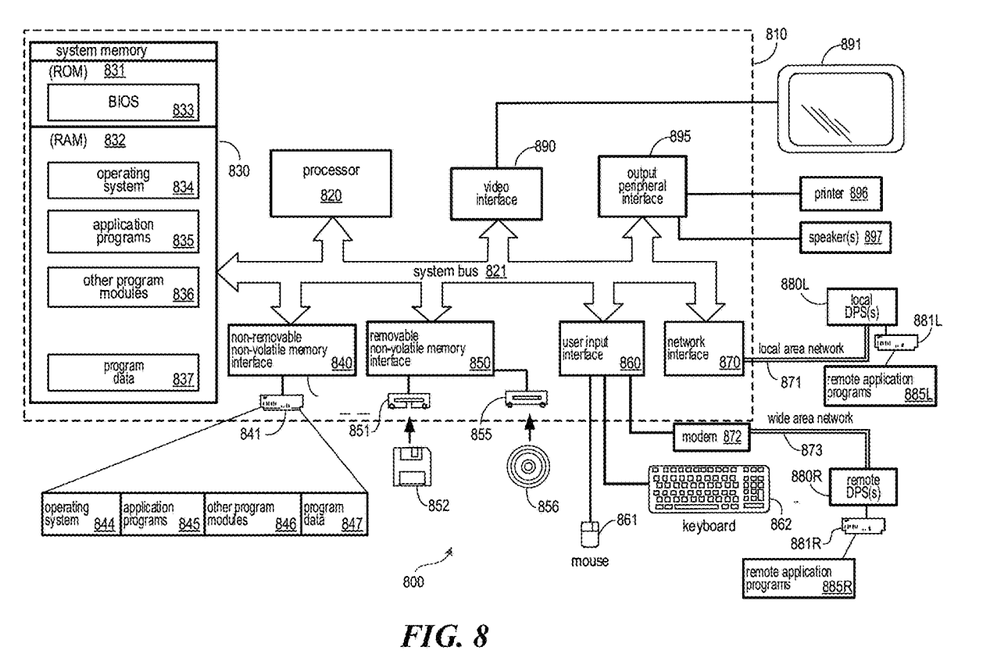
FIG. 8 depicts an example of a computing environment that can be specially adapted with computer programming instructions to locate missing program elements in response to an execution or compiling error caused by a request for a program element that is not in a working folder or in a location specified by a path.

FIG. 8 depicts, in further detail, components of a data-processing system 110 that can be adapted to implement a programming environment and missing program element locate-and-resume processes as described above. Some or all of the components shown may be present in a computing system 200, for example. In a distributed computing environment, some components may be located on a server and some components may be located on a client device. In some embodiments, a device for implementing a programming environment with missing program element locate-and-resume features can include a computing device 810 which can be embodied as a desktop computer, a workstation, or a laptop computer. Suitable workstations include Dell Precision series of workstations from Dell, Inc. of Round Rock, Tex., the HP Z400, Z600 and Z800 series of workstations from Hewlett Packard Co. of Palo Alto, Calif., among others. Other computing devices that may be used include palm computers and other portable computing devices, e.g., smart phones.

Components of computing device 810 can include, but are not limited to, a processing unit 820, a memory 830, and a bus 821 that couples various components including the memory to the processing unit 820. Example processing units 820 include, but are not limited to, single or multicore processors, such as the Core™ Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

The bus 821 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 can include one or more types of machine-readable media. Machine-readable media can be any available media that can be accessed by computer 810 and includes both volatile and nonvolatile, manufactured storage media, removable and non-removable manufactured storage media. By way of example, and not limitation, machine-readable media may comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can be accessed by computer 810.

The memory 830 can include computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, may be stored in ROM 831. RAM 832 may contain data and/or program modules that are immediately accessible to and/or presently being operated on by processing unit 820. By way of example, and not limitation, FIG. 8 illustrates an operating system 834, application programs 835, other program modules 836, and program data 837.

The computer 810 can also include other removable/non-removable, volatile/nonvolatile machine-readable media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 841 may be connected to the system bus 821 through a non-removable memory interface such as interface 840, and magnetic disk drive 851 and optical disk drive 855 may be connected to the system bus 821 by a removable memory interface, such as interface 850.

The drives and their associated machine-readable media discussed above and illustrated in FIG. 8, provide storage of machine-readable instructions, data structures, program modules and other data for the computer 810. In FIG. 8, for example, hard disk drive 841 is illustrated as storing operating system 844, application programs 845, other program modules 846, and program data 847. These components may either be the same as, or different from, operating system 834, application programs 835, other program modules 836, and program data 837. Operating system 844, application programs 845, other program modules 846, and program data 847 are given different numbers here to illustrate that, at a minimum, they are different copies.

A user can enter commands and information into the computer 810 through input devices such as a keyboard 862 and pointing device 861, commonly referred to as a mouse, trackball or touch pad. Other input devices (not shown) can include a microphone, joystick, game pad, satellite dish, scanner, or the like. These and other input devices can be connected to the processing unit 820 through a user input interface 860 that is coupled to the system bus, but can be connected by other interface and bus structures, such as a parallel port, game port or a universal serial bus (USB). A monitor 891 or other type of display device can also be connected to the system bus 821 via an interface, such as a video interface 890. In addition to the monitor, a computing device 810 can also include other peripheral output devices such as speakers 897 and printer 896, which can be connected through an output peripheral interface 895.

The computer 810 can operate in a networked environment using logical connections to one or more remote devices, such as a remote computer 880. The remote computer 880 may be a personal computer, a server, a router, a network PC, a peer device or other common network node, and may include many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments may be commonplace in offices, enterprise-wide computer networks, intranets and the Internet. Network connections can be wired, optical fiber based, or wireless.

When used in a LAN networking environment, the computer 810 can be connected to the LAN 871 through a network interface or adapter 870. When used in a WAN networking environment, the computer 810 may include a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in a remote memory storage device. By way of example, and not limitation, FIG. 8 illustrates remote application programs 885 as residing on memory device 881. It will be appreciated that the network connections shown are exemplary and other means of establishing a communications link between the computers may be used.

Example methods of the described technology include combinations of methods (1) through (16) as described below. Examples of computer-readable medium that can be implemented according to the described technology are indicated by configuration (17). An example system that can be implemented according to the described technology is indicated by configuration (18).

(1) In a programming environment, a computer-implemented comprising receiving, by a computing system, a run-time or compile-time instruction that requires accessing a program element in a working folder or in a folder specified by a path, wherein the program element is identified by an identifier; detecting that the program element is not present in the working folder or the folder specified by the path and that the instruction cannot be performed; in response to detecting that the program element is not present in the working folder or the folder specified by the path, reviewing folder-history data that records folders previously accessed by the user; searching one or more folders identified from the folder-history data to locate a program element having the identifier; or searching one or more related folders to locate the program element, wherein the one or more related folders comprise any combination of super-folders, sibling folders, and sub-folders; and providing location display data containing information that indicates to the user one or more folders in which a program element having the identifier is located.

(2) The method of (1), wherein the folder-history data is maintained across multiple user sessions by a system supporting the programming environment.

(3) The method of (1) or (2), wherein detecting that the program element is not present in the working folder or the folder specified by the path comprises intercepting, by a first handler, an exception generated in response to the program element not being present in the working folder or the folder specified by the path.

(4) The method of (3), wherein providing location display data comprises replacing an error message that would have been generated by a second handler with the location display data.

(5) The method of (4), wherein the error message corresponds to an undefined file or missing file exception.

(6) The method of any one of (1) through (5), further comprising providing, with the location display data, active text or an icon that, when selected, automatically changes a user's current folder location to a first folder of the one or more folders.

(7) The method of any one of (1) through (6), further comprising providing, with the location display data, active text or an icon that, when selected, automatically defines a folder path to the programming environment that allows access to a first folder of the one or more folders from a user's current folder location.

(8) The method of any one of (1) through (7), further comprising prioritizing the searching based on temporal data stored with the folder-history data.

(9) The method of any one of (1) through (5), further comprising searching one or a combination of the super-folders, sibling folders, and sub-folders prior to searching other folders for a program element having the identifier.

(10) The method of any one of (1) through (9), further comprising if the program element is not located in any folder of the one or more folders, searching the one or more folders for one or more relevant program elements associated with the program element, wherein the one or more relevant program elements were previously used in combination with the program element; and in response to locating a first relevant program element of the one or more relevant program elements in a first folder, providing location display data that includes information indicating that the program element may be located in the first folder.

(11) The method of any one of (1) through (10), wherein the accessing comprises calling an executable program element for use with an algorithm executed in the programming environment.

(12) The method of any one of (1) through (11), wherein the programming environment comprises executing an interpretive programming language.

(13) The method of any one of (1) through (12), wherein the programming environment supports graphical programming or textual programming.

(14) The method of any one of (1) through (13), wherein the instruction comprises an include statement or a function call executed within code.

(15) The method of any one of (1) through (14), further comprising recording in the folder-history data the one or more folders in response to the user accessing the one or more folders.

(16) The method of any one of (1) through (15), further comprising automatically changing a user's current folder location to a first folder of the one or more folders or automatically defining a folder path to the programming environment that allows access to the first folder of the one or more folders from a user's current folder location, wherein the automatically changing and automatically defining occur without user selection.

(17) Computer readable medium containing instructions that, when executed by at least one processor, adapt a system that includes the at least one processor to perform acts of any one of methods (1) through (16).

(18) A computing system comprising at least one processor adapted with executable instructions to receive, by a the computing system, a run-time or compile-time instruction that requires accessing a program element in a working folder or in a folder specified by a path, wherein the program element is identified by an identifier; detecting that the program element is not present in the working folder or the folder specified by the path and that the instruction cannot be performed; in response to detecting that the program element is not present in the working folder or the folder specified by the path, review folder-history data that records folders previously accessed by the user; searching one or more folders identified from the folder-history data to locate a program element having the identifier; or search one or more related folders to locate the program element, wherein the one or more related folders comprise any combination of super-folders, sibling folders, and sub-folders; and provide location display data containing information that indicates to the user one or more folders in which a program element having the identifier is located.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. In a programming environment, a computer-implemented method comprising:
    receiving, by a computing system, a run-time or compile-time instruction that requires accessing a program element in a working folder or in a folder specified by a path, wherein the program element is identified by an identifier;
    detecting that the program element is not present in the working folder or the folder specified by the path and that the instruction cannot be performed;
    in response to detecting that the program element is not present in the working folder or the folder specified by the path, reviewing folder-history data that records folders previously accessed by a user;
    searching one or more folders identified from the folder-history data to locate a program element having the identifier; or
    searching one or more related folders to locate the program element, wherein the one or more related folders comprise any combination of super-folders, sibling folders, or sub-folders; and providing location display data containing information that indicates to the user or another user one or more folders in which a program element having the identifier is located;

wherein the folder-history data is maintained across multiple user sessions by a system supporting the programming environment.

2. The method of claim 1, wherein detecting that the program element is not present in the working folder or the folder specified by the path comprises intercepting, by a first handler, an exception generated in response to the program element not being present in the working folder or the folder specified by the path.

3. The method of claim 2, wherein providing location display data comprises replacing an error message that would have been generated by a second handler with the location display data.

4. The method of claim 3, wherein the error message corresponds to an undefined file or missing file exception.

5. The method of claim 1, further comprising providing, with the location display data, active text or an icon that, when selected, automatically changes a user's current folder location to a first folder of the one or more folders.

6. The method of claim 1, further comprising providing, with the location display data, active text or an icon that, when selected, automatically defines a folder path to the programming environment that allows access to a first folder of the one or more folders from a user's current folder location.

7. The method of claim 1, further comprising prioritizing the searching based on temporal data stored with the folder-history data.

8. The method of claim 1, further comprising searching one or a combination of the super-folders, sibling folders, or sub-folders prior to searching other folders for a program element having the identifier.

9. The method of claim 1, further comprising:
if the program element is not located in any folder of the one or more folders, searching the one or more folders for one or more relevant program elements associated with the program element, wherein the one or more relevant program elements were previously used in combination with the program element; and
in response to locating a first relevant program element of the one or more relevant program elements in a first folder, providing location display data that includes information indicating that the program element may be located in the first folder.

10. The method of claim 1, wherein the accessing comprises calling an executable program element for use with an algorithm executed in the programming environment.

11. The method of claim 1, wherein the programming environment comprises executing an interpretive programming language.

12. The method of claim 1, wherein the programming environment supports graphical programming or textual programming.

13. The method of claim 1, wherein the instruction comprises an include statement or a function call executed within code.

14. The method of claim 1, further comprising:
recording in the folder-history data the one or more folders in response to the user accessing the one or more folders.

15. The method of claim 1, further comprising automatically changing a user's current folder location to a first folder of the one or more folders or automatically defining a folder path to the programming environment that allows access to the first folder of the one or more folders from a user's current folder location, wherein the automatically changing and automatically defining occur without user selection.

16. A computing system comprising at least one processor for use in a computer implemented programming environment, configured to:
receive, by the computing system, a run-time or compile-time instruction that requires accessing a program element in a working folder or in a folder specified by a path, wherein the program element is identified by an identifier;
detect that the program element is not present in the working folder or the folder specified by the path and that the instruction cannot be performed;
in response to detecting that the program element is not present in the working folder or the folder specified by the path, reviewing folder-history data that records folders previously accessed by a user;
search one or more folders identified from the folder-history data to locate a program element having the identifier; or
search one or more related folders to locate the program element, wherein the one or more related folders comprise any combination of super-folders, sibling folders, or sub-folders; and
provide location display data containing information that indicates to the user or another user one or more folders in which a program element having the identifier is located;
wherein the folder-history data is maintained across multiple user sessions by a system supporting the programming environment.

17. The computing system of claim 16, wherein detecting that the program element is not present in the working folder or the folder specified by the path comprises intercepting, by a first handler, an exception generated in response to the program element not being present in the working folder or the folder specified by the path.

18. The computing system of claim 17, wherein providing location display data comprises replacing an error message that would have been generated by a second handler with the location display data.

19. The computing system of claim 18 wherein the error message corresponds to an undefined file or missing file exception.

20. The computing system of claim 16, further comprising providing, with the location display data, active text or an icon that, when selected, automatically changes a user's current folder location to a first folder of the one or more folders.

21. The computing system of claim 16, further comprising providing, with the location display data, active text or an icon that, when selected, automatically defines a folder path to the programming environment that allows access to a first folder of the one or more folders from a user's current folder location.

22. The computing system of claim 16, further comprising prioritizing the searching based on temporal data stored with the folder-history data.

23. The computing system of claim 16, further comprising searching one or a combination of the super-folders, sibling folders, or sub-folders prior to searching other folders for a program element having the identifier.

24. A non-transitory computer readable storage medium have computer readable instructions stored thereon that, when executed by a processor of a computing system, perform a method comprising:

receiving, by the computing system, a run-time or compile-time instruction that requires accessing a program element in a working folder or in a folder specified by a path, wherein the program element is identified by an identifier;

detecting that the program element is not present in the working folder or the folder specified by the path and that the instruction cannot be performed;

in response to detecting that the program element is not present in the working folder or the folder specified by the path, reviewing folder-history data that records folders previously accessed by a user;

searching one or more folders identified from the folder-history data to locate a program element having the identifier; or     searching one or more related folders to locate the program element, wherein the one or more related folders comprise any combination of super-folders, sibling folders, or sub-folders; and     providing location display data containing information that indicates to the user or another user one or more folders in which a program element having the identifier is located;

wherein the folder-history data is maintained across multiple user sessions by a system supporting the programming environment.

25. The non-transitory computer readable storage medium of claim 24, wherein detecting that the program element is not present in the working folder or the folder specified by the path comprises intercepting, by a first handler, an exception generated in response to the program element not being present in the working folder or the folder specified by the path.

26. The non-transitory computer readable storage medium of claim 25, wherein providing location display data comprises replacing an error message that would have been generated by a second handler with the location display data.

27. The non-transitory computer readable storage medium of claim 26, wherein the error message corresponds to an undefined file or missing file exception.

28. The non-transitory computer readable storage medium of claim 24, further comprising providing, with the location display data, active text or an icon that, when selected, automatically changes a user's current folder location to a first folder of the one or more folders.

29. The non-transitory computer readable storage medium of claim 24, further comprising providing, with the location display data, active text or an icon that, when selected, automatically defines a folder path to the programming environment that allows access to a first folder of the one or more folders from a user's current folder location.

30. The non-transitory computer readable storage medium of claim 24, further comprising prioritizing the searching based on temporal data stored with the folder-history data.

31. The non-transitory computer readable storage medium of claim 24, further comprising searching one or a combination of the super-folders, sibling folders, or sub-folders prior to searching other folders for a program element having the identifier.

* * * * *